US012614396B2

(12) United States Patent　　　　(10) Patent No.: US 12,614,396 B2
Moll et al.　　　　　　　　　　　　　(45) Date of Patent: *Apr. 28, 2026

(54) AR ASSISTED SAFE CYCLING

(71) Applicant: Snap Inc., Santa Monica, CA (US)

(72) Inventors: Sharon Moll, Lachen (CH); Tomasz Zakrzewski, Lachen (CH)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,024

(22) Filed: Aug. 27, 2024

(65) Prior Publication Data

US 2024/0420484 A1　　Dec. 19, 2024

Related U.S. Application Data

(63) Continuation of application No. 17/840,346, filed on Jun. 14, 2022, now Pat. No. 12,106,580.

(51) Int. Cl.
*G06V 20/58*　　　(2022.01)
*B60W 30/18*　　　(2012.01)
(Continued)

(52) U.S. Cl.
CPC ....... *G06V 20/58* (2022.01); *B60W 30/18109* (2013.01); *G06F 1/163* (2013.01);
(Continued)

(58) Field of Classification Search
CPC . G06V 20/58; G06V 20/20; B60W 30/18109; B60W 40/105; B60W 2420/403; B60W 2510/18; G06F 1/163
See application file for complete search history.

(56) References Cited

U.S. PATENT DOCUMENTS 10,496,104 B1　12/2019　Liu et al.
10,766,498 B2　9/2020　Kleen et al.
(Continued)

FOREIGN PATENT DOCUMENTS

CN　　103852909 A　6/2014
CN　　106652089 A　5/2017
(Continued)

OTHER PUBLICATIONS

"U.S. Appl. No. 17/840,346, 312 Amendment filed Jul. 30, 2024", 6 pgs.
(Continued)

*Primary Examiner* — Jared Walker
(74) *Attorney, Agent, or Firm* — Schwegman Lundberg & Woessner, P.A.

(57) ABSTRACT

Disclosed is a method of providing a proximity warning using a head-worn device. A distance is determined between the head-worn device and a relevant object, such as a cyclist, jogger or vehicle, using image-processing techniques. A speed of the head-worn device is determined using a GPS receiver or other position components located in the head-worn device or an associated user device. A braking distance for the head-worn device is determined based on the speed of the head-worn device, and compared to the distance to the relevant object. A warning notification is provided by the head-worn device if the distance to the relevant object is less than the braking distance.

20 Claims, 10 Drawing Sheets

(51) Int. Cl.
    *B60W 40/105*     (2012.01)
    *G06F 1/16*     (2006.01)

(52) U.S. Cl.
    CPC ..... *B60W 40/105* (2013.01); *B60W 2420/403*
        (2013.01); *B60W 2510/18* (2013.01)

(56)           References Cited

U.S. PATENT DOCUMENTS

| | | | |
|---|---|---|---|
| 2010/0253593 | A1 | 10/2010 | Seder et al. |
| 2014/0098136 | A1 | 4/2014 | Fein et al. |
| 2016/0048203 | A1 | 2/2016 | Blum et al. |
| 2017/0101056 | A1 | 4/2017 | Park |
| 2017/0287217 | A1 | 10/2017 | Kim et al. |
| 2018/0090007 | A1 | 3/2018 | Takemori et al. |
| 2018/0096604 | A1 | 4/2018 | Morimura et al. |
| 2018/0157036 | A1 | 6/2018 | Choi et al. |
| 2018/0189568 | A1 | 7/2018 | Powderly et al. |
| 2018/0286268 | A1 | 10/2018 | Ni |
| 2019/0049968 | A1 | 2/2019 | Dean et al. |
| 2019/0172262 | A1 | 6/2019 | Mchugh et al. |
| 2020/0019782 | A1 | 1/2020 | Narayanaswami et al. |
| 2020/0056892 | A1 | 2/2020 | Haque et al. |
| 2020/0073527 | A1 | 3/2020 | Bandishti |
| 2020/0089956 | A1 | 3/2020 | Alalusi |
| 2020/0363216 | A1 | 11/2020 | Elvanoglu |
| 2020/0369149 | A1 | 11/2020 | Kassner et al. |
| 2021/0012113 | A1 | 1/2021 | Petill et al. |
| 2021/0046997 | A1* | 2/2021 | Levi ........................ B62K 3/00 |
| 2021/0072817 | A1 | 3/2021 | Bond et al. |
| 2021/0088784 | A1 | 3/2021 | Whitmire et al. |
| 2021/0146945 | A1 | 5/2021 | Brown et al. |
| 2021/0241723 | A1 | 8/2021 | Tucker et al. |
| 2022/0237878 | A1 | 7/2022 | Tartz et al. |
| 2022/0289176 | A1 | 9/2022 | Baek |
| 2023/0088065 | A1 | 3/2023 | Dudar |
| 2023/0098451 | A1 | 3/2023 | Brown et al. |
| 2023/0105428 | A1 | 4/2023 | Brown et al. |
| 2023/0115501 | A1 | 4/2023 | Mu et al. |
| 2023/0306690 | A1 | 9/2023 | Brown et al. |
| 2023/0401873 | A1 | 12/2023 | Moll et al. |

FOREIGN PATENT DOCUMENTS

| | | | |
|---|---|---|---|
| CN | 109059929 | A | 12/2018 |
| CN | 109087485 | A | 12/2018 |
| DE | 102013217558 | A1 | 3/2015 |
| DE | 102019202576 | A1 | 8/2020 |
| EP | 3137975 | A1 | 3/2017 |
| EP | 3184365 | A2 | 6/2017 |
| EP | 3454013 | A1 | 3/2019 |
| EP | 3577606 | B1 | 9/2022 |
| KR | 20120133309 | A | 12/2012 |
| WO | WO-2017095790 | A1 | 6/2017 |
| WO | WO-2018217498 | A1 | 11/2018 |
| WO | WO-2020212808 | A1 | 10/2020 |
| WO | WO-2023009580 | A2 | 2/2023 |
| WO | WO-2023055803 | A1 | 4/2023 |
| WO | WO-2023183314 | A1 | 9/2023 |
| WO | WO-2023244924 | A1 | 12/2023 |

OTHER PUBLICATIONS

"U.S. Appl. No. 17/840,346, Non Final Office Action mailed Jan. 29, 2024", 13 pgs.

"U.S. Appl. No. 17/840,346, Notice of Allowance mailed May 28, 2024", 18 pgs.

"U.S. Appl. No. 17/840,346, PTO Response to Rule 312 Communication mailed Aug. 9, 2024", 2 pgs.

"U.S. Appl. No. 17/840,346, Response filed Apr. 29, 2024 to Non Final Office Action mailed Jan. 29, 2024", 9 pgs.

"International Application Serial No. PCT/US2023/068033, International Search Report mailed Oct. 4, 2023", 3 pgs.

"International Application Serial No. PCT/US2023/068033, Written Opinion mailed Oct. 4, 2023", 3 pgs.

U.S. Appl. No. 17/840,346, filed Jun. 14, 2022, AR Assisted Safe Cycling.

"Chinese Application Serial No. 202380046606.6, Office Action mailed Jun. 6, 2025", w/ English Translation, 22 pgs.

"International Application Serial No. PCT/US2023/068033, International Preliminary Report on Patentability mailed Dec. 26, 2024", 5 pgs.

\* cited by examiner

AR ASSISTED SAFE CYCLING

RELATED APPLICATION DATA

This is a continuation of U.S. patent application Ser. No. 17/840,346 filed on Jun. 14, 2022, the contents of which are incorporated herein as if explicitly set forth.

TECHNICAL FIELD

The present disclosure relates generally to augmented reality devices and interfaces, and more particularly to the use of a head-worn AR device to provide proximity warnings.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality."

A head-worn device may additionally completely occlude a user's visual field and display a virtual environment through which a user may move or be moved. This is typically referred to as "virtual reality." As used herein, the term "augmented reality" or "AR" refers to both augmented reality and virtual reality as traditionally understood, unless the context indicates otherwise.

A user of the head-worn device may access a messaging or social network application to view or share content with other users of the application. In some cases, live or stored content can be viewed and enhanced or modified by the user. That is, images, video or other media for enhancement can be captured from a live camera or can be retrieved from local or remote data storage.

As referred to herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real world are enhanced by computer-generated perceptual information. In this context an "augmented reality effect" comprises the collection of data, parameters, and other assets needed to apply a selected augmented reality experience to an image or a video feed. In some examples, augmented reality effects are provided by Snap, Inc. under the registered trademark LENSES.

AR effects and associated systems and modules for modifying content using AR effects may thus involve detection of objects (e.g., faces, hands, bodies, cats, dogs, surfaces, objects), tracking of such objects as they leave, enter, and move around the field of view in video frames, and the modification or transformation of such objects as they are tracked. In various examples, different methods for achieving such transformations may be used. For example, some examples may involve generating a 3D mesh model of the object or objects, and using transformations and animated textures of the model within the video to achieve the transformation. In other examples, tracking of points on an object may be used to place an image or texture, which may be two dimensional or three dimensional, at the tracked position. In still further examples, neural network analysis of video frames may be used to place images, models, or textures in content (e.g., images or frames of video). AR effect data thus may include both the images, models, and textures used to create transformations in content, as well as additional modeling and analysis information needed to achieve such transformations with object detection, tracking, and placement.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
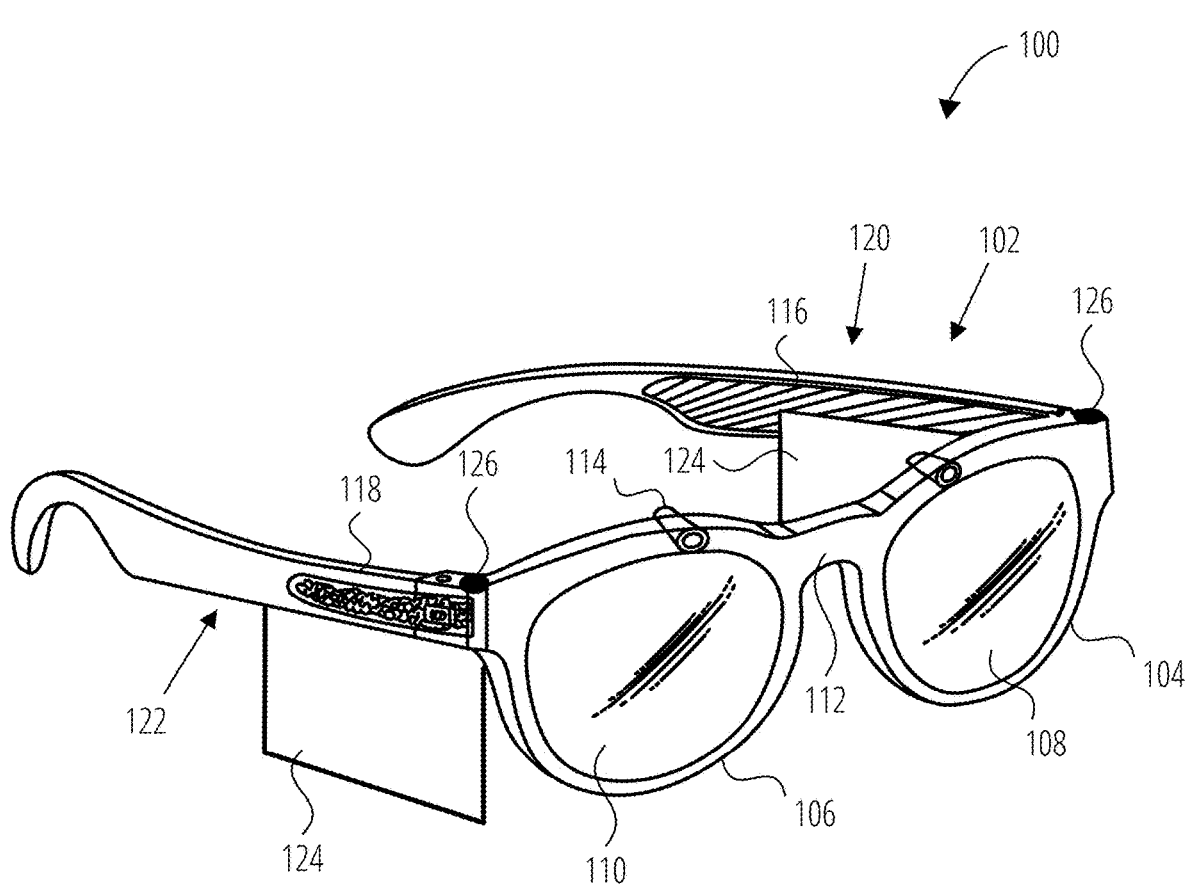
FIG. 1 is a perspective view of a head-worn device, according to some examples.

Known head-worn devices, such as AR glasses, include a transparent or semi-transparent display that enables a user to see through the transparent or semi-transparent display to view the surrounding environment. Additional information or objects (e.g., virtual objects such as 3D renderings, images, video, text, and so forth) may be shown on the display and appear as a part of, and/or overlaid upon, the surrounding environment to provide an augmented reality experience for the user. The display may for example include a waveguide that receives a light beam from a projector, but any appropriate display for presenting augmented or virtual content to the wearer may be used.

The rider of a bicycle, motorbike or other powered or unpowered vehicle may be unaware of unsafe distances for following other vehicles. A head-worn device, with its image-processing and other tracking capabilities, can monitor the speed of the bicycle and the distance to other cyclists riding ahead. If the distance between the rider and the cyclist ahead becomes less than an expected braking distance based on the surface and the terrain, a warning prompt can be provided by the glasses 100 to the rider. The warning may be visual, audible or a combination of both.

In some examples, provided is a method of providing a proximity warning using a head-worn device including a camera and one or more display devices. The method includes capturing images using the camera of the head-worn device, determining a distance between the head-worn device and a relevant object using image-processing techniques performed on the captured images, determining a speed of the head-worn device using position components located in the head-worn device or an associated user device, determining a braking distance for the head-worn device based on the speed of the head-worn device, comparing the distance to the relevant object with the braking distance, and based on the distance to the relevant object being less than the braking distance, providing a warning notification.

The speed may be determined using data received from a GPS received located in the head-worn device or the associated user device. The warning notification may include a visual notification displayed on one or more of the display devices of the head-worn device.

The braking distance may further be determined based on user-specific parameters, such as a user weight or a bicycle type. The braking distance may further be determined based on environmental parameters, such as a surface type or an incline.

In some examples, provided is a head-worn device system that includes one or more cameras, one or more display devices and one or more processors. The head-worn device system also includes a memory storing instructions that, when executed by the one or more processors, configure the system to perform operations to provide a proximity warning, according to any of the methods and limitations described above, including but not limited to capturing images using a camera of the head-worn device, determining a distance between the head-worn device and a relevant object using image-processing techniques performed on the captured images, determining a speed of the head-worn device using position components located in the head-worn device or an associated user device, determining a braking distance for the head-worn device based on the speed of the head-worn device, comparing the distance to the relevant object with the braking distance, and based on the distance to the relevant object being less than the braking distance, providing a warning notification.

In some examples, provided is a non-transitory computer-readable storage medium, the computer-readable storage medium including instructions that when executed by a head-worn device system including one or more display devices and a camera, cause the head-worn device system to perform operations to provide a proximity warning according to any of the methods and limitations described above, including but not limited to capturing images using the camera of the head-worn device, determining a distance between the head-worn device and a relevant object using image-processing techniques performed on the captured images, determining a speed of the head-worn device using position components located in the head-worn device or an associated user device, determining a braking distance for the head-worn device based on the speed of the head-worn device, comparing the distance to the relevant object with the braking distance, and based on the distance to the relevant object being less than the braking distance, providing a warning notification.

Other technical features may be readily apparent to one skilled in the art from the following figures, descriptions, and claims.

FIG. 1 is perspective view of a head-worn device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. Each of the right optical element 110 and the left optical element 108 can be a lens, a display, a display assembly, or a combination of the foregoing. Any suitable display assembly can be provided in the glasses 100.

The frame 102 additionally includes a left arm or temple piece 120 and a right arm or temple piece 122. In some examples the frame 102 can be formed from a single piece of material so as to have a unitary or integral construction.

The glasses 100 can include a computing device, such as a computer 118, which can be of any suitable type so as to be carried by the frame 102 and, in one or more examples, of a suitable size and shape, so as to be at least partially disposed in one of the temple piece 120 or the temple piece 122. The computer 118 can include one or more processors with memory, wireless communication circuitry, and a power source. As discussed below, the computer 118 comprises low-power circuitry, high-speed circuitry, and a display processor. Various other examples may include these elements in different configurations or integrated together in different ways. Additional details of aspects of computer 118 may be implemented as illustrated by the data processor 302 discussed below.

The computer 118 additionally includes a battery 116 or other suitable portable power supply. In some examples, the battery 116 is disposed in left temple piece 120 and is electrically coupled to the computer 118 disposed in the right temple piece 122. The glasses 100 can include a connector or port (not shown) suitable for charging the battery 116, a wireless receiver, transmitter or transceiver (not shown), or a combination of such devices.

The glasses 100 include cameras 114. Although two cameras are depicted, other examples contemplate the use of a single or additional (i.e., more than two) cameras. In one or more examples, the glasses 100 include any number of input sensors or other input/output devices in addition to the camera 114. Such sensors or input/output devices can additionally include biometric sensors, location sensors, motion sensors, and so forth.

The glasses 100 may also include a touchpad 124 mounted to or integrated with one or both of the left temple piece 120 and right temple piece 122. The touchpad 124 is generally vertically-arranged, approximately parallel to a user's temple in some examples. As used herein, generally vertically aligned means that the touchpad is at least more vertical than horizontal, although potentially more vertical than that. Additional user input may be provided by one or more buttons 126, which in the illustrated examples are provided on the outer upper edges of the left optical element holder 104 and right optical element holder 106. The one or more touchpads 124 and buttons 126 provide a means whereby the glasses 100 can receive input from a user of the glasses 100.

Figure 2:
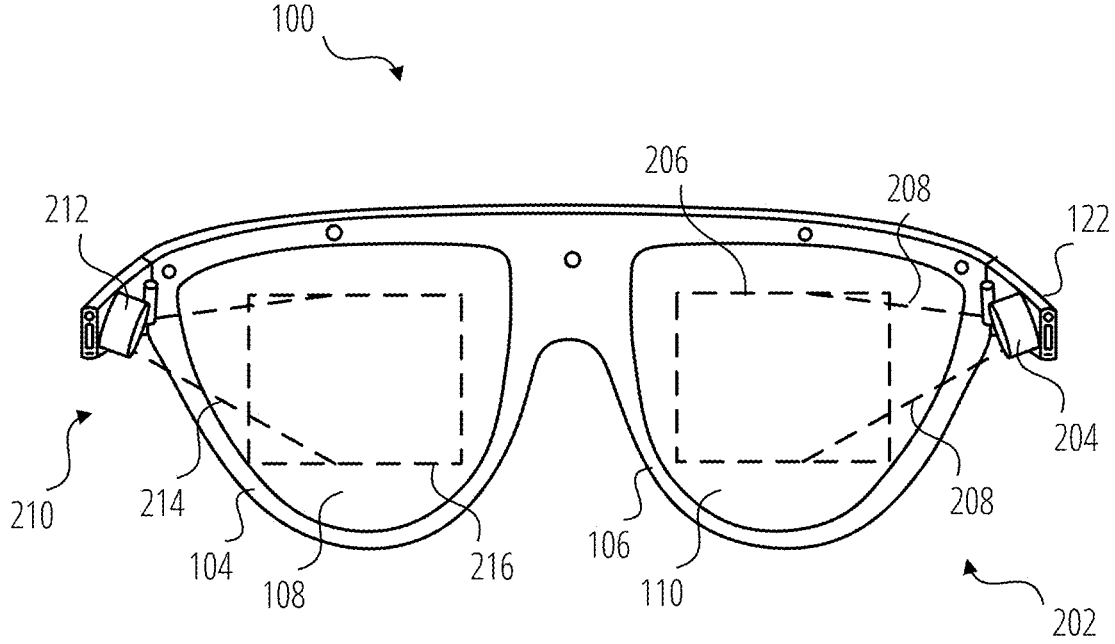
FIG. 2 illustrates a further view of the head-worn device of FIG. 1, according to some examples.

FIG. 2 illustrates the glasses 100 from the perspective of a wearer. For clarity, a number of the elements shown in FIG. 1 have been omitted. As described in FIG. 1, the glasses 100 shown in FIG. 2 include left optical element 108 and right optical element 110 secured within each of the left optical element holder 104 and the right optical element holder 106 respectively.

The glasses 100 include forward optical assembly 202 comprising a right projector 204 and a right near eye display 206, and a forward optical assembly 210 comprising a left projector 212 and a near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user.

It will be appreciated however that other display technologies or configurations may be provided that can display an image to a user in a forward field of view. For example, instead of a projector 204 and a waveguide, an LCD, LED or other display panel or surface may be provided instead.

In use, a wearer of the glasses 100 will be presented with information, content and various user interfaces on the near eye displays. As described in more detail below, the user can then interact with the glasses 100 using a touchpad 124 and/or the buttons 126, in addition to providing voice inputs or touch inputs on an associated device, for example user device 328 illustrated in FIG. 3.

Figure 3:
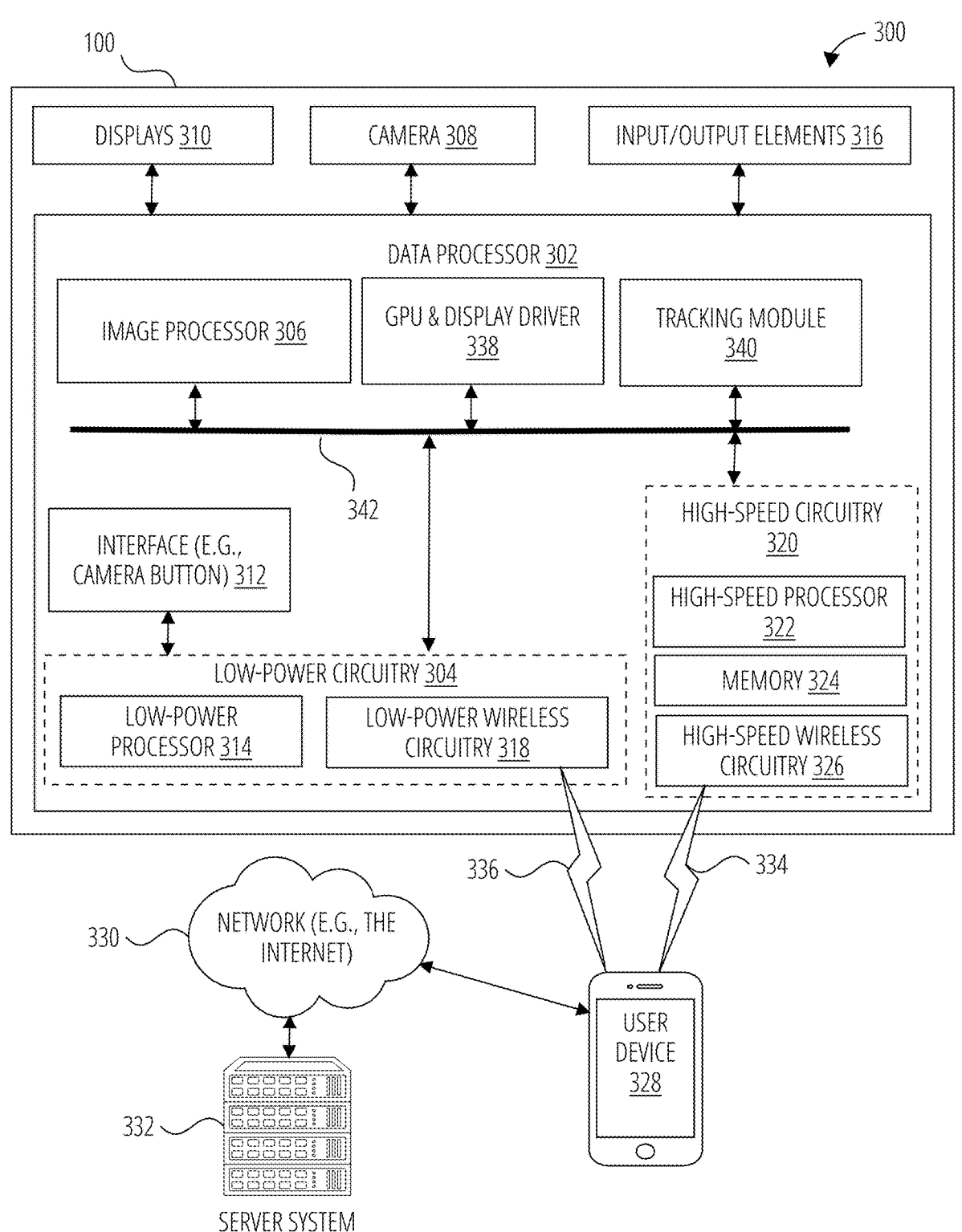
FIG. 3 is a block diagram illustrating a networked system 300 including details of the head-worn device of FIG. 1, according to some examples.

FIG. 3 is a block diagram illustrating a networked system 300 including details of the glasses 100, in accordance with some examples.

The networked system 300 includes the glasses 100, a user device 328, and a server system 332. The user device 328 may be a smartphone, tablet, phablet, laptop computer, access point, or any other such device capable of connecting with the glasses 100 using both a low-power wireless connection 336 and a high-speed wireless connection 334. The user device 328 is connected to the server system 332 via the network 330. The network 330 may include any combination of wired and wireless connections. The server system 332 may be one or more computing devices as part of a service or network computing system. The glasses 100, user device 328 and any elements of the server system 332 and network 330 may be implemented using details of the software architecture 904 or the machine 1000 described in FIG. 9 and FIG. 10.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 9 and FIG. 10. For example, the input/output elements 316 may include any of I/O components 1006 including output components 1028, motion components 1036, and so forth. Examples of the displays 310 are discussed in FIG. 2. In the particular examples described herein, the displays 310 include a display for each one of a user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the camera 308. In other examples, the interface 312 may have a software component, or may be associated with a command received wirelessly from another source, such as from the user device 328.

The image processor 306 includes circuitry to receive signals from the camera 308 and process those signals from the camera 308 into a format suitable for storage in the memory 324 or for transmission to the user device 328. In one or more examples, the image processor 306 (e.g., video processor) comprises a microprocessor integrated circuit (IC) customized for processing sensor data from the camera 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the user device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system needed for the data processor 302. The high-speed processor 322 includes processing resources needed for managing high-speed data transfers on the high-speed wireless connection 334 using the high-speed wireless circuitry 326. In certain examples, the high-speed processor 322 executes an operating system such as a LINUX operating system or other such operating system such as the operating system 912 of FIG. 9. In addition to any other responsibilities, the high-speed processor 322 executing a software architecture for the data processor 302 is used to manage data transfers with the high-speed wireless circuitry 326. In certain examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the camera 308 and the image processor 306. While the memory 324 is shown as integrated with the high-speed circuitry 320, in other examples, the memory 324 may be an independent stand-alone element of the data processor 302. In certain such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is needed.

The tracking module 340 provides various position, orientation and object tracking functions. For example, the tracking module 340 uses image data and corresponding inertial data from the camera 308 and the position components 1040, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment, which permits the visual placement of virtual objects relative to physical objects by the glasses 100 within the field of view of the user via the displays 310.

The tracking module 340 also identifies and tracks relevant objects within the field of view of the cameras 308 of the glasses 100 using object recognition techniques, and determines their depth in the field of view from the glasses 100 using known image-processing techniques.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the user device 328, or on a remote server. For example, one or more functions or operations described herein may be performed by one of the applications 906 such as messaging application 946.

Figure 4:
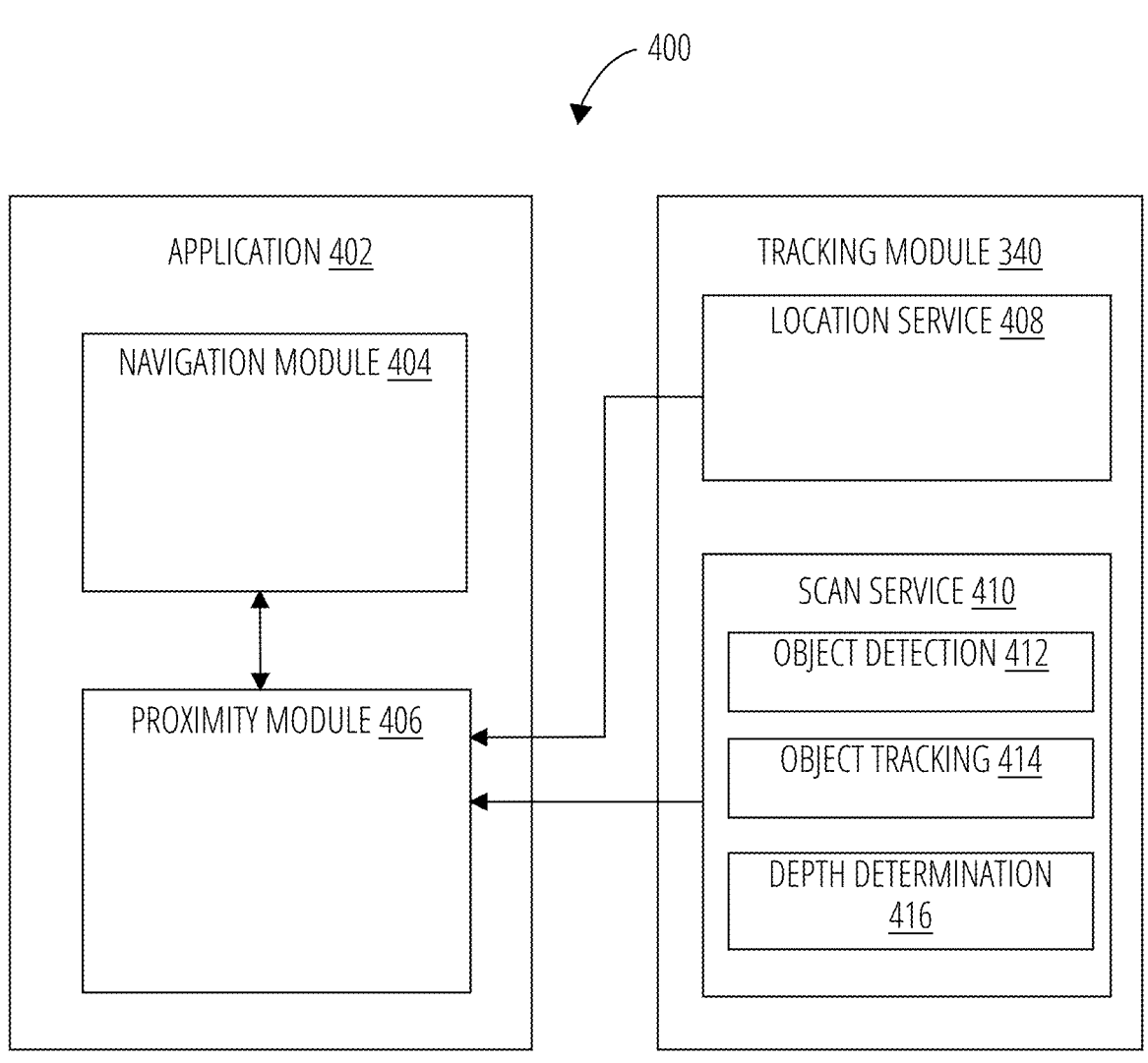
FIG. 4 is an architecture 400 for the proximity warning system, according to some examples.

FIG. 4 is an architecture 400 for the proximity warning system, according to some examples. The architecture 400 is shown embodied in a combination of an application 402 running on the glasses 100, user device 328 or a combination thereof, and a tracking module 340.

The application 402 includes a navigation module 404 and a proximity module 406. The application 402 uses the services provided by the tracking module 340. The tracking module 340 includes a location service 408 that provides information about the location of the glasses 100 or user device 328, and a scan service 410. The scan service 410 provides object detection, object tracking, and depth determination from an object detection service 412, an object tracking service 414 and a depth determination service 416 respectively. The scan service 410 uses known image-processing techniques performed on images captured by one or more of the cameras 114 in the glasses 100, to perform object detection, tracking and depth determination.

In some examples, the application 402 is a messaging client 814 (see FIG. 8) that is part of a social networking or messaging system 800 provided by a single entity. In other examples, the application 402 is a third-party application designed to work with the glasses 100 or the user device 328, and the proximity module 406 is a plugin supplied by the provider of the messaging system 800 to enable developers to access features and abilities of the glasses 100, user device 328 or messaging system 800. The proximity module 406 may for example be provided as part of a software development kit (SDK).

In some examples, as shown in FIG. 4, the application 402 includes a navigation module 404 that provides navigation prompts and instructions to allow a user to navigate from one location to the other, but it will be appreciated that many different modules and types of applications 402 could be used, such as sporting or fitness applications that might benefit from the use of the proximity module 406.

In use of the application 402, the navigation module 404 provides navigation information to the user via the glasses 100, while receiving any warning notifications from the proximity module 406 when the user gets too close to an object, such as a jogger, a vehicle or a person on a bicycle who is riding ahead of the user.

The proximity module 406 receives location and scan service information from the tracking module 340. Using the speed of the glasses 100 or user device 328 (as a proxy for the speed of a user) a safe minimum braking distance is determined. The safe minimum braking distance is compared with the distance of the user from a relevant object that has been detected and tracked by the scan service 410. Relevant detected objects can include cyclists, runners, cars, and so forth. The depth from the glasses 100 to the object as determined by the depth determination service 416 is used as the distance to the detected object for the purposes of this comparison. If the distance to the relevant object is less than the minimum safe braking distance, the glasses 100 provide a warning notification.

Figure 5:
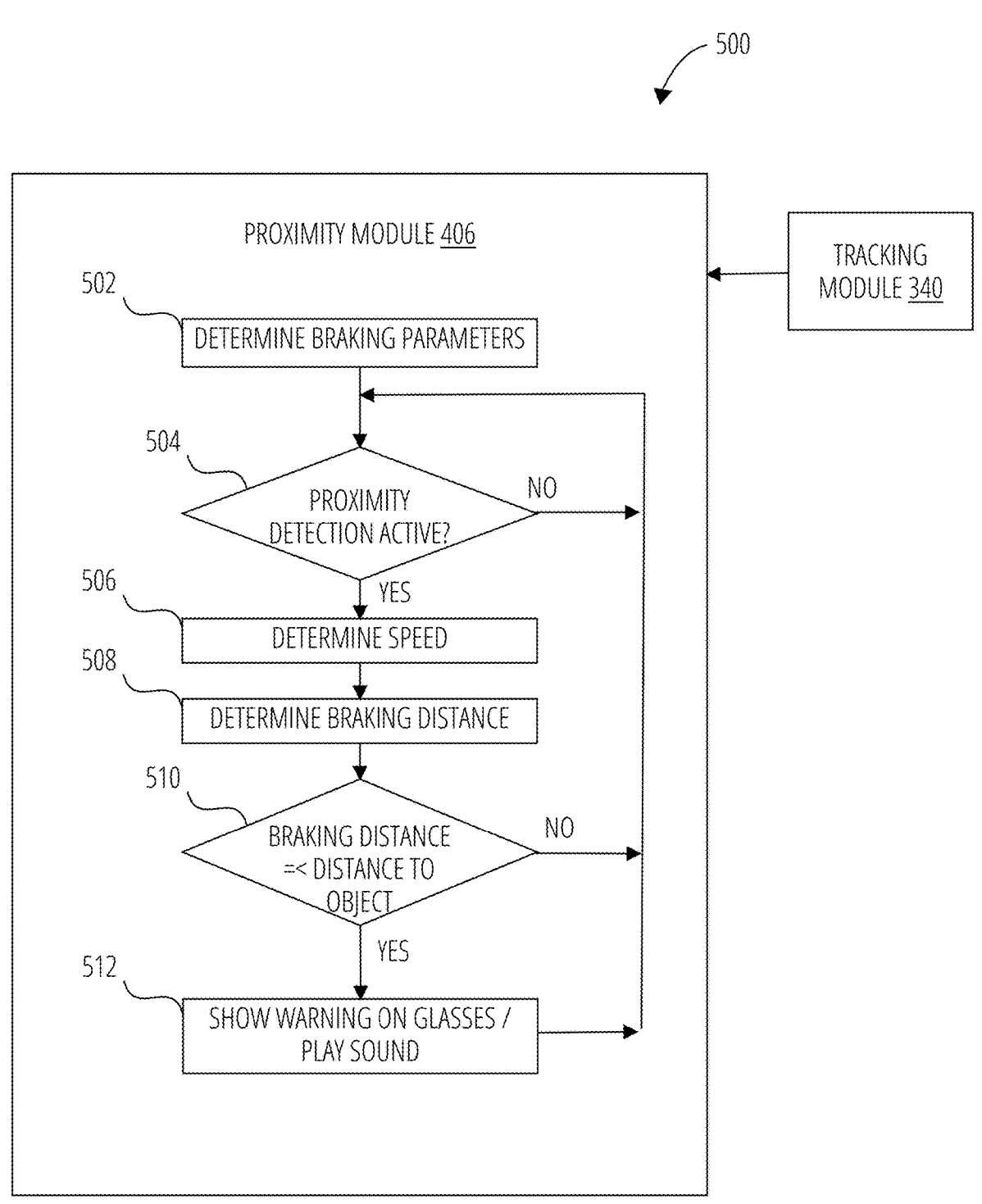
FIG. 5 illustrates a flowchart executed by a proximity module, according to some examples.

FIG. 5 illustrates a flowchart 500 executed by the proximity module 406 in some examples. The proximity module 406 performs the flowchart 500 based on location and object tracking information received from the tracking module 340 as described above, to determine a safe minimum braking distance to a person or vehicle being followed.

In some examples, relevant parameters for use in determining the braking acceleration or in determining the braking distance are associated with a user's profile (such as the mass of the user, the type and mass of the bicycle) or are received as user input to the application 402 when commencing the navigation or activity. The braking acceleration or braking distance will also depend on environmental parameters, such as the type of surface (tarmac or gravel or a dirt track) as well as the incline of the surface. The type of surface may be received as user input or determined from the location information received from the tracking module 340 in conjunction with map data stored locally or accessed from a remote server. The incline can be determined from the location information, direction of travel, and a profile of the route determined by the navigation module 404 in conjunction with the map data.

For example, a heavier rider riding downhill on a mountain bike on a gravel trail will have a smaller safe maximum braking acceleration based on their heavier mass and the type of surface, which, combined with traveling downhill, will translate into a longer safe minimum braking distance compared to a light rider riding on a level tarmac road on a road bike.

The flowchart 500 begins at operation 502, in which relevant braking parameters are accessed (in the case of parameters associated with a user profile), received as user input in response to a prompt, or otherwise determined, such as by accessing map data based on the location of the glasses 100 (and thus the user).

In operation 504, the proximity module 406 determines whether or not proximity detection is active. The proximity module 406 determines whether or not proximity detection is active based, for example, on a notification to activate or deactivate proximity detection that is received from the navigation module 404, or from another aspect or function performed by the application 402. If proximity detection is not active, the method returns to operation 502.

If proximity detection is active, in operation 506 the proximity module 406 determines the speed of the glasses 100 or user device 328 (as a proxy for the speed of a user) from the location information received from the tracking module 340. In some examples, the location information is based on the receipt of repeated updates of the position of the glasses 100 or user device 328 as reported by a GPS receiver or other position components 1040 (see FIG. 10) in the user device 328 or glasses 100. Alternatively, or in addition to GPS data, the location information may be provided or supplemented by data received from inertial sensors such as accelerometers and rotational sensors.

In operation 508, the proximity module 406 determines the braking distance of the bicycle or other personal mobility device or vehicle being ridden by the user. The braking distance depends on the retardation available and the speed of the user as determined in operation 506. The retardation may be a default known safe maximum braking acceleration for the activity in question (such as cycling), but may be determined for the particular individual, activity, equipment and terrain to provide a more accurate estimate.

In some examples, the relevant parameters (user weight, equipment type, surface type and so forth) are used to determine a maximum safe retardation force that can be used with the speed to determine the minimum safe braking distance using known equations for speed, acceleration and distance. Alternatively, a default braking distance determined from the user's speed can be adjusted using an adjustment factor to account for the relevant parameter being different from the parameter associated with the standard braking distance.

In operation 510, the braking distance determined in operation 508 is compared to the distance to the object or person being followed. In some examples, the distance to the object being followed is the depth information received from the depth determination service 416 in the tracking module 340. As described above, the tracking module 340, using images captured by a camera 114 of the glasses 100, has detected one or more relevant objects using object detection service 412, has tracked the relevant objects using object tracking service 414, and has determined the distances (depths) from the glasses 100 to one or more relevant objects using the depth determination service 416. If the braking distance is greater than the distance from the glasses 100 to the closest relevant object, as determined by the depth determination service 416, the method returns to operation 502 and proceeds from there.

If the distance from the glasses 100 to the closest relevant object is less than or equal to the minimum safe braking distance, then a warning notification is displayed by the glasses 100 in operation 512. Alternatively or additionally, the glasses 100 may play a warning sound. The flowchart then returns to operation 504 and proceeds from there.

Figure 6:
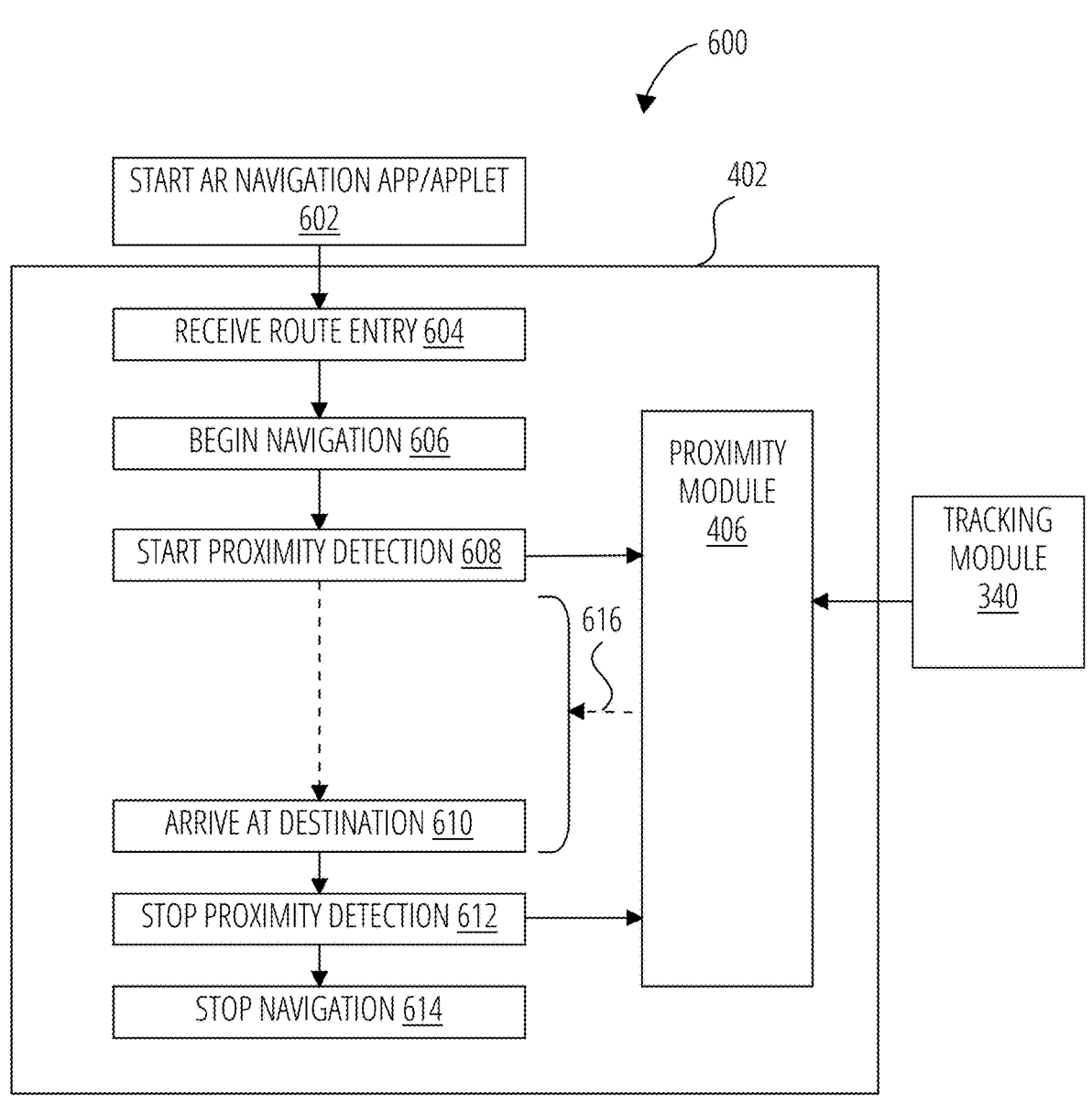
FIG. 6 illustrates a flowchart 600 executed by the application 402, according to some examples.

FIG. 6 illustrates a flowchart 600 executed by the application 402 in some examples. The application 402 performs the flowchart 600 in conjunction with the proximity module 406, which operates as described above in FIG. 5.

The flowchart 600 starts at operation 602 with receipt of user input starting the application 402 or starting a navigation function within the application 402, such as a navigation applet. The application 402 receives user input of route information in operation 604, including at least a destination and any optional navigation items selected, such as a choice between available routes, to avoid highways and so forth. Alternatively, a saved or known route can be selected. Upon completion of route entry in operation 604, the application 402 begins navigating in operation 606 and provides navigational guidance to the user via visual and/or audible prompts provided via the glasses 100.

Figure 7:
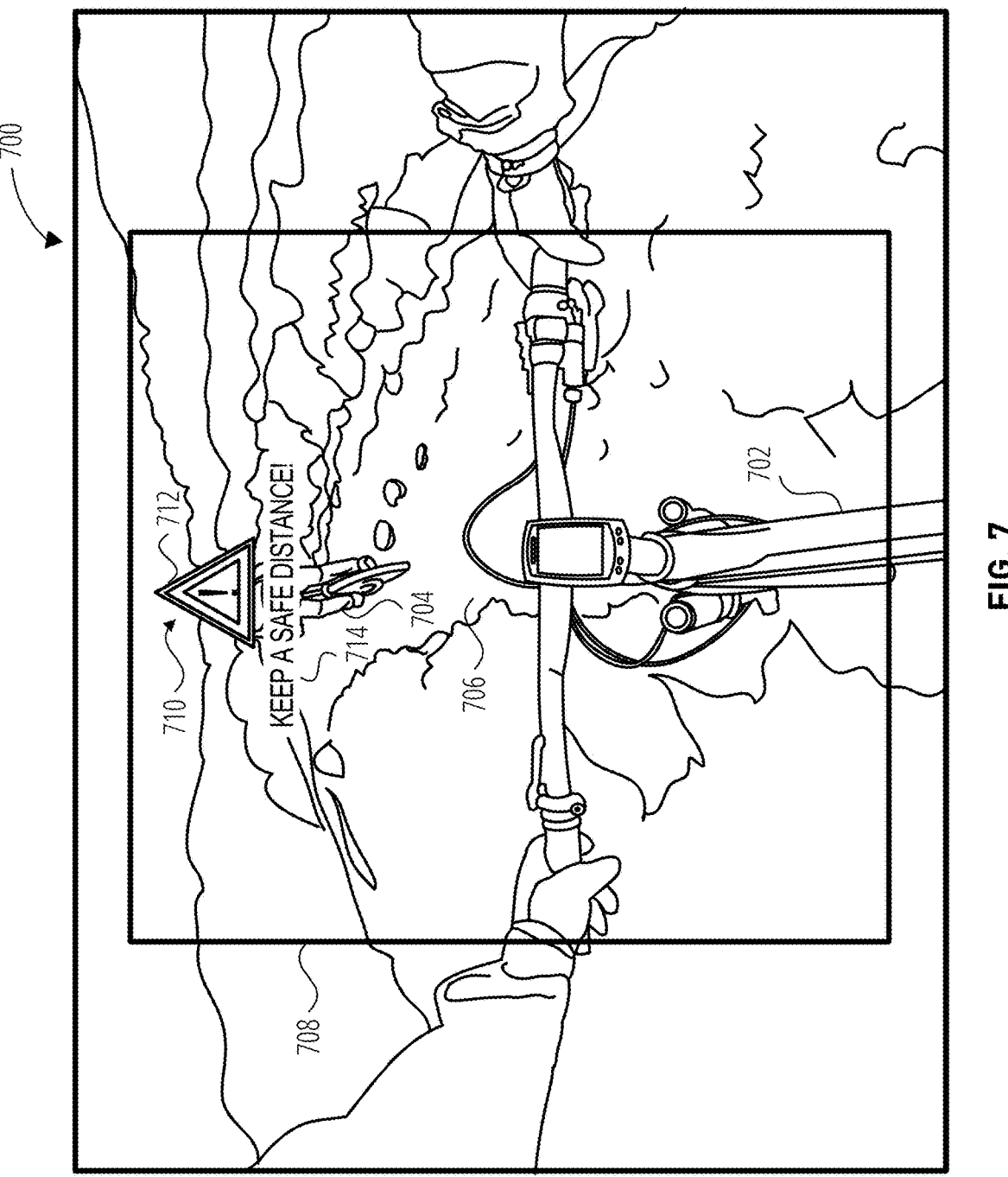
FIG. 7 illustrates a field of view 700 seen by a wearer of the glasses 100, according to some examples.

In operation 608 the application 402 instructs the proximity module 406 to begin proximity detection as discussed above with reference to FIG. 5. The proximity module 406 then performs the flowchart 500, providing any triggered warnings to the application 402 as indicated by arrow 616. Any warnings that are received from the proximity module 406 are presented by the glasses, for example as shown in FIG. 7.

The navigation then proceeds until arriving at the destination in operation 610, at which time the application 402 notifies the proximity module 406 to stop proximity detection in operation 612. Navigation also stops in operation 614, at which time the application 402 returns to a higher-level user interface.

For explanatory purposes, the operations of the flowchart 500 and flowchart 600 are described herein as occurring in serial, or linearly. However, multiple operations of the flowcharts may occur in parallel and need not be performed in the order shown and/or can be replaced by other operations. The operations in the flowcharts will typically execute on the data processor 302 and associated hardware in or associated with the glasses 100.

Various implementations are of course possible, with some of the operations taking place in user device 328 in an application such as messaging application 946, on server system 332, or with one application on the user device 328 calling another application or SDK for required functionality. In some examples, the operations are performed jointly between messaging application 946 running on the user device 328 and the data processor 302 and associated hardware in or associated with the glasses 100.

FIG. 7 illustrates a field of view 700 seen by a wearer of the glasses 100 according to some examples. Shown in the field of view are items in the real world that are visible through the optical elements 108 and 110, including a bicycle 702 being ridden by the user along a gravel path 706. The user is following a cyclist 704 along the path 706.

The user of the glasses 100 is travelling at a speed along the gravel path 706 at a following distance from the cyclist 704, as determined above by the glasses 100. The following distance has been determined to be less than the minimum safe braking distance under the circumstances. The glasses 100 have presented a dialog box 708 in the field of view 700 that includes a warning prompt 710 including a warning sign 712 and warning text 714.

Figure 8:
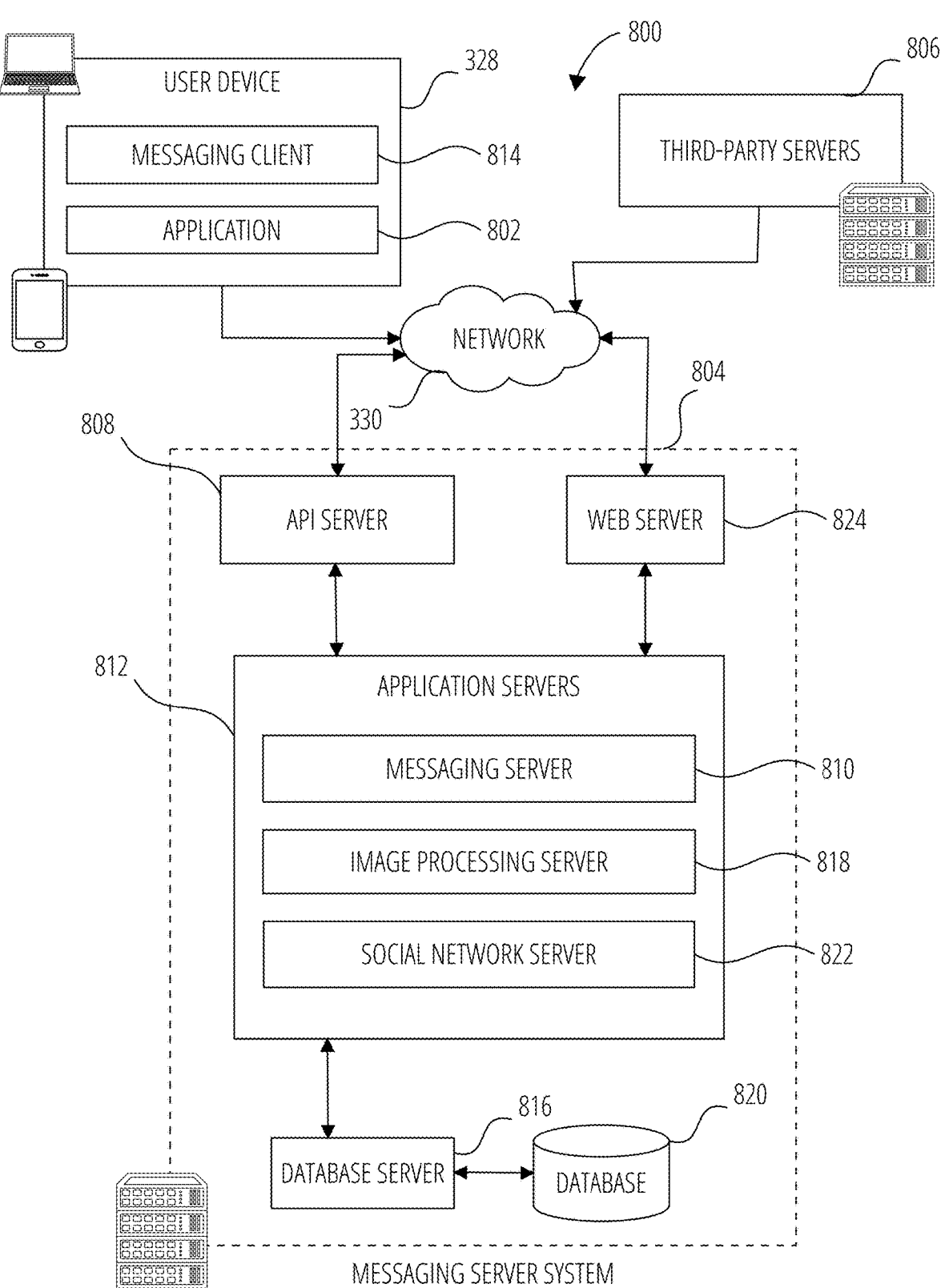
FIG. 8 is a diagrammatic representation of a networked environment in which the present disclosure may be deployed, in accordance with some examples.

FIG. 8 is a block diagram showing an example messaging system 800 for exchanging data (e.g., messages and associated content) over a network. The messaging system 800 includes multiple instances of a user device 328, each of which hosts a number of applications, including a messaging client 814 and other applications 802. Each messaging client 814 is communicatively coupled to other instances of the messaging client 814 (e.g., hosted on respective other user devices 328), a messaging server system 804 and third-party servers 806 via a network 330 (e.g., the Internet). A messaging client 814 can also communicate with locally-hosted applications 802 using Applications Program Interfaces (APIs).

A messaging client 814 is able to communicate and exchange data with other messaging clients 814 and with the messaging server system 804 via the network 330. The data exchanged between messaging clients 814, and between a messaging client 814 and the messaging server system 804, includes functions (e.g., commands to invoke functions) as well as payload data (e.g., text, audio, video or other multimedia data).

The messaging server system 804 provides server-side functionality via the network 330 to a particular messaging client 814. While certain functions of the messaging system 800 are described herein as being performed by either a messaging client 814 or by the messaging server system 804, the location of certain functionality either within the messaging client 814 or the messaging server system 804 may be a design choice. For example, it may be technically preferable to initially deploy certain technology and functionality within the messaging server system 804 but to later migrate this technology and functionality to the messaging client 814 where a user device 328 has sufficient processing capacity.

The messaging server system 804 supports various services and operations that are provided to the messaging client 814. Such operations include transmitting data to, receiving data from, and processing data generated by the messaging client 814. This data may include message content, client device information, geolocation information, media augmentation and overlays, message content persistence conditions, social network information, and live event information, as examples. Data exchanges within the messaging system 800 are invoked and controlled through functions available via user interfaces (UIs) of the messaging client 814.

Turning now specifically to the messaging server system 804, an Application Program Interface (API) server 808 is coupled to, and provides a programmatic interface to, application servers 812. The application servers 812 are communicatively coupled to a database server 816, which facilitates access to a database 820 that stores data associated with messages processed by the application servers 812. Similarly, a web server 824 is coupled to the application servers 812, and provides web-based interfaces to the application servers 812. To this end, the web server 824 processes incoming network requests over the Hypertext Transfer Protocol (HTTP) and several other related protocols.

The Application Program Interface (API) server 808 receives and transmits message data (e.g., commands and message payloads) between the user device 328 and the application servers 812. Specifically, the Application Program Interface (API) server 808 provides a set of interfaces (e.g., routines and protocols) that can be called or queried by the messaging client 814 in order to invoke functionality of the application servers 812. The Application Program Interface (API) server 808 exposes various functions supported by the application servers 812, including account registration, login functionality, the sending of messages, via the application servers 812, from a particular messaging client 814 to another messaging client 814, the sending of media files (e.g., images or video) from a messaging client 814 to a messaging server 810, and for possible access by another messaging client 814, the settings of a collection of media data (e.g., story), the retrieval of a list of friends of a user of a user device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 814).

The application servers 812 host a number of server applications and subsystems, including for example a messaging server 810, an image processing server 818, and a social network server 822. The messaging server 810 implements a number of message processing technologies and functions, particularly related to the aggregation and other processing of content (e.g., textual and multimedia content) included in messages received from multiple instances of the messaging client 814. As will be described in further detail, the text and media content from multiple sources may be aggregated into collections of content (e.g., called stories or galleries). These collections are then made available to the messaging client 814. Other processor and memory intensive processing of data may also be performed server-side by the messaging server 810, in view of the hardware requirements for such processing.

The application servers 812 also include an image processing server 818 that is dedicated to performing various image processing operations, typically with respect to images or video within the payload of a message sent from or received at the messaging server 810.

The social network server 822 supports various social networking functions and services and makes these functions and services available to the messaging server 810. To this end, the social network server 822 maintains and accesses an entity graph within the database 820. Examples of functions and services supported by the social network server 822 include the identification of other users of the messaging system 800 with which a particular user has relationships or is "following," and also the identification of other entities and interests of a particular user.

Returning to the messaging client 814, features and functions of an external resource (e.g., an application 802 or applet) are made available to a user via an interface of the messaging client 814. In this context, "external" refers to the fact that the application 802 or applet is external to the messaging client 814. The external resource is often provided by a third party but may also be provided by the creator or provider of the messaging client 814. The messaging client 814 receives a user selection of an option to launch or access features of such an external resource. The external resource may be the application 802 installed on the user device 328 (e.g., a "native app"), or a small-scale version of the application (e.g., an "applet") that is hosted on the user device 328 or remote of the user device 328 (e.g., on third-party servers 806). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the messaging client 814. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 814 determines whether the selected external resource is a web-based external resource or a locally-installed application 802. In some cases, applications 802 that are locally installed on the user device 328 can be launched independently of and separately from the messaging client 814, such as by selecting an icon, corresponding to the application 802, on a home screen of the user device 328. As used herein, an icon can include one or both of text and graphic elements. Small-scale versions of such applications can be launched or accessed via the messaging client 814 and, in some examples, no or limited portions of the small-scale application can be accessed outside of the messaging client 814. The small-scale application can be launched by the messaging client 814 receiving, from a third-party server 806 for example, a markup-language document associated with the small-scale application and processing such a document.

In response to determining that the external resource is a locally-installed application 802, the messaging client 814 instructs the user device 328 to launch the external resource by executing locally-stored code corresponding to the external resource. In response to determining that the external resource is a web-based resource, the messaging client 814 communicates with the third-party servers 806 (for example) to obtain a markup-language document corresponding to the selected external resource. The messaging client 814 then processes the obtained markup-language document to present the web-based external resource within a user interface of the messaging client 814.

Figure 9:
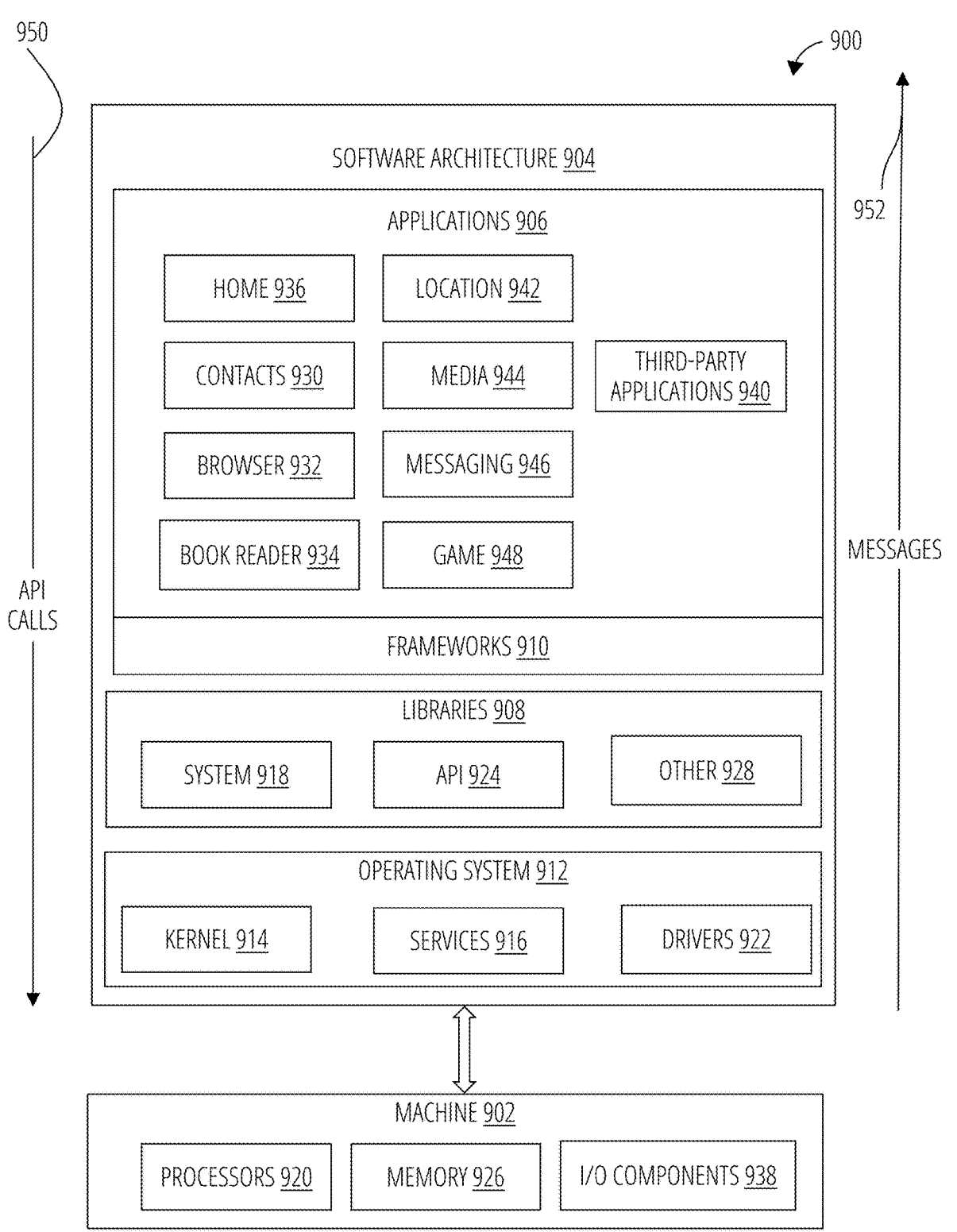
FIG. 9 is a block diagram showing a software architecture within which the present disclosure may be implemented, in accordance with some examples.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 908, frameworks 910, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 908 provide a low-level common infrastructure used by the applications 906. The libraries 908 can include system libraries 918 (e.g., C standard library) that provide functions such as memory allocation functions, string manipulation functions, mathematic functions, and the like. In addition, the libraries 908 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 908 can also include a wide variety of other libraries 928 to provide many other APIs to the applications 906.

The frameworks 910 provide a high-level common infrastructure that is used by the applications 906. For example, the frameworks 910 provide various graphical user interface (GUI) functions, high-level resource management, and high-level location services. The frameworks 910 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as third-party applications 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party applications 940 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 940 can invoke the API calls 950 provided by the operating system 912 to facilitate functionality described herein.

Figure 10:
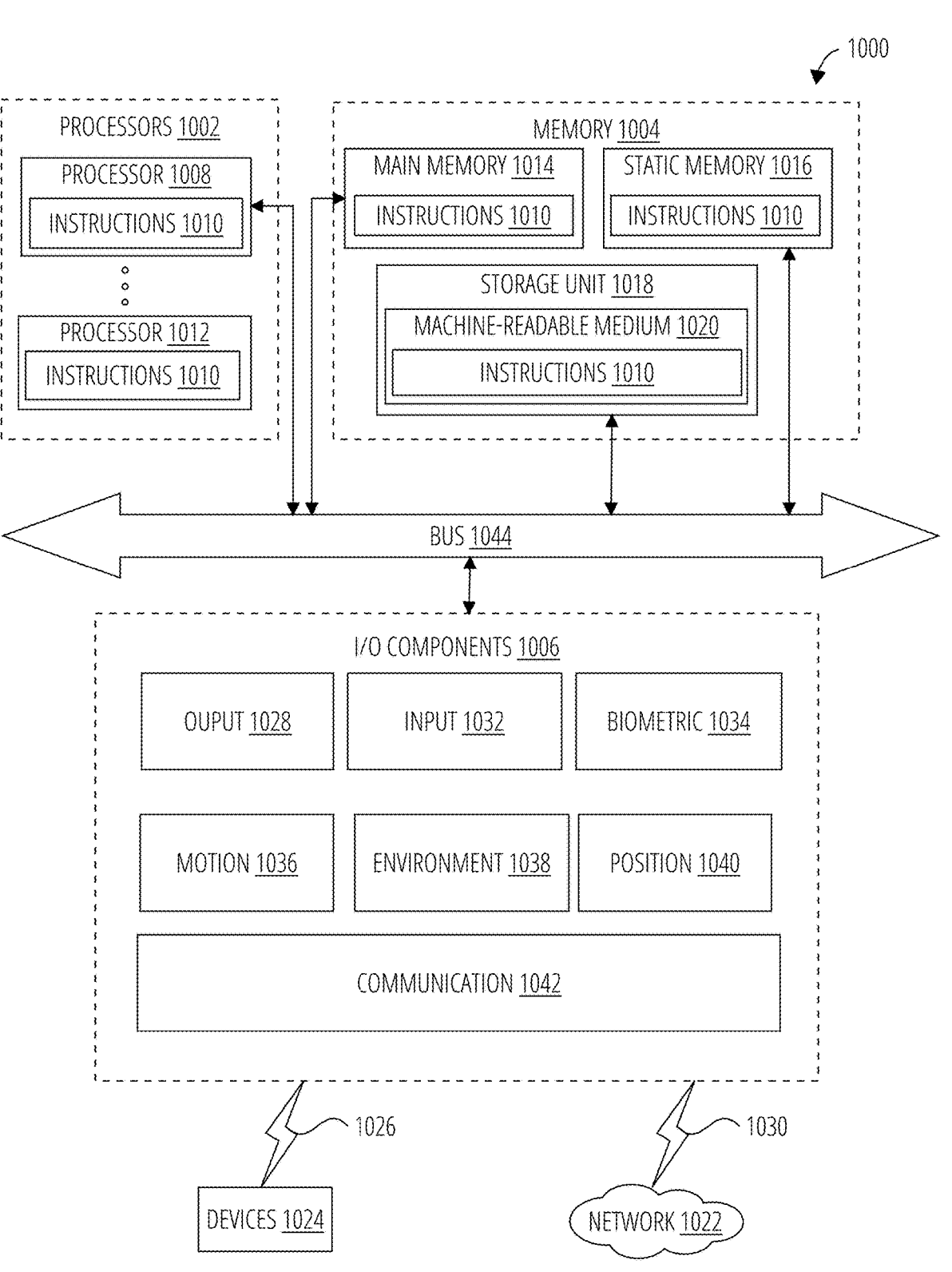
FIG. 10 is a diagrammatic representation of a machine, in the form of a computer system within which a set of instructions may be executed for causing the machine to perform any one or more of the methodologies discussed, in accordance with some examples.

FIG. 10 is a diagrammatic representation of a machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1002, memory 1004, and I/O components 1006, which may be configured to communicate with each other via a bus 1044. In an example, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1014, a static memory 1016, and a storage unit 1018, both accessible to the processors 1002 via the bus 1044. The main memory 1004, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1002 (e.g., within the processor's cache memory), or any suitable combination thereof, during execution thereof by the networked system 300.

The I/O components 1006 may include a wide variety of components to receive input, provide output, produce output, transmit information, exchange information, capture measurements, and so on. The specific I/O components 1006 that are included in a particular machine will depend on the type of machine. For example, portable machines such as mobile phones may include a touch input device or other such input mechanisms, while a headless server machine will likely not include such a touch input device. It will be appreciated that the I/O components 1006 may include many other components that are not shown in FIG. 10. In various examples, the I/O components 1006 may include output components 1028 and input components 1032. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1032 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1006 may include biometric components 1034, motion components 1036, environmental components 1038, or position components 1040, among a wide array of other components. For example, the biometric components 1034 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1036 include acceleration sensor components (e.g., accelerometer), gravitation sensor components, rotation sensor components (e.g., gyroscope), and so forth. The environmental components 1038 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1040 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1006 further include communication components 1042 operable to couple the networked system 300 to a network 1022 or devices 1024 via a coupling 1030 and a coupling 1026, respectively. For example, the communication components 1042 may include a network interface component or another suitable device to interface with the network 1022. In further examples, the communication components 1042 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1042 may detect identifiers or include components operable to detect identifiers. For example, the communication components 1042 may include Radio Frequency Identification (RFID)

tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1042, such as location via Internet Protocol (IP) geolocation, location via Wi-Fi® signal triangulation, location via detecting an NFC beacon signal that may indicate a particular location, and so forth.

The various memories (e.g., memory 1004, main memory 1014, static memory 1016, and/or memory of the processors 1002) and/or storage unit 1018 may store one or more sets of instructions and data structures (e.g., software) embodying or used by any one or more of the methodologies or functions described herein. These instructions (e.g., the instructions 1010), when executed by processors 1002, cause various operations to implement the disclosed examples.

The instructions 1010 may be transmitted or received over the network 1022, using a transmission medium, via a network interface device (e.g., a network interface component included in the communication components 1042) and using any one of a number of well-known transfer protocols (e.g., hypertext transfer protocol (HTTP)). Similarly, the instructions 1010 may be transmitted or received using a transmission medium via the coupling 1026 (e.g., a peer-to-peer coupling) to the devices 1024.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to non-transitory machine-storage media. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

The invention claimed is:

1. A method of providing a proximity warning using a head-worn device including a camera and one or more display devices, comprising:
  capturing images using the camera of the head-worn device;
  determining a distance between the head-worn device and a relevant object using image-processing techniques performed on the captured images;

determining a speed of the head-worn device using position components located in the head-worn device or an associated user device;

determining a braking distance for the head-worn device based on the speed of the head-worn device and based on user-specific parameters including a user weight or a bike type accessed from a user's profile;

comparing the distance to the relevant object with the braking distance; and based on the distance to the relevant object being less than the braking distance, providing a warning notification.

2. The method of claim 1, further comprising:

determining the speed using data received from a GPS receiver located in the head-worn device or the associated user device.

3. The method of claim 1, wherein the warning notification comprises a visual notification displayed on the one or more display devices of the head-worn device.

4. The method of claim 1, wherein the braking distance is further determined based on environmental parameters.

5. The method of claim 4, wherein the environmental parameters are determined from data identifying the location of the head-worn device, and map data.

6. The method of claim 4, wherein the environmental parameters include a surface type or an incline.

7. The method of claim 1, wherein the braking distance is further determined based on at least one environmental parameter, the at least one environmental parameter including an incline determined from data identifying a location of the head-worn device and a direction of travel, and map data including profile information.

8. A head-worn device system comprising:

one or more cameras;

one or more display devices;

one or more processors; and a memory storing instructions that, when executed by the one or more processors, configure the head-worn device system to perform operations to provide a proximity warning, comprising:

capturing images using a camera of the head-worn device system;

determining a distance between the head-worn device system and a relevant object using image-processing techniques performed on the captured images;

determining a speed of the head-worn device system using position components located in the head-worn device system or an associated user device;

determining a braking distance for the head-worn device system based on the speed of the head-worn device system and based on user-specific parameters including a user weight or a bike type accessed from a user's profile;

comparing the distance to the relevant object with the braking distance; and based on the distance to the relevant object being less than the braking distance, providing a warning notification.

9. The head-worn device system of claim 8, wherein the warning notification comprises a visual notification displayed on the one or more display devices of the head-worn device system.

10. The head-worn device system of claim 8, wherein the operations further comprise:

determining the speed using data received from a GPS receiver located in the head-worn device system or the associated user device.

11. The head-worn device system of claim 8, wherein the braking distance is further determined based on environmental parameters.

12. The head-worn device system of claim 11, wherein the environmental parameters are determined from information identifying the location of the head-worn device system, and map data.

13. The head-worn device system of claim 11, wherein the environmental parameters include a surface type or an incline.

14. The head-worn device system of claim 8, wherein the braking distance is further determined based on at least one environmental parameter, the at least one environmental parameter including an incline determined from data identifying a location of the head-worn device system and a direction of travel, and map data including profile information.

15. A non-transitory computer-readable storage medium, the computer-readable storage medium including instructions that when executed by a head-worn device system including one or more display devices and a camera, cause the head-worn device system to perform operations to provide a proximity warning, comprising:

capturing images using the camera of the head-worn device system;

determining a distance between the head-worn device system and a relevant object using image-processing techniques performed on the captured images;

determining a speed of the head-worn device system using position components located in the head-worn device system or an associated user device;

determining a braking distance for the head-worn device system based on the speed of the head-worn device system and based on user-specific parameters including a user weight or a bike type accessed from a user's profile;

comparing the distance to the relevant object with the braking distance; and based on the distance to the relevant object being less than the braking distance, providing a warning notification.

16. The non-transitory computer-readable storage medium of claim 15, wherein the operations further comprise:

determining the speed using data received from a GPS receiver located in the head-worn device system or the associated user device.

17. The non-transitory computer-readable storage medium of claim 15, wherein the braking distance is further determined based on environmental parameters.

18. The non-transitory computer-readable storage medium of claim 17, wherein the environmental parameters are determined from information identifying the location of the head-worn device system, and map data.

19. The non-transitory computer-readable storage medium of claim 17, wherein the environmental parameters include a surface type or an incline.

20. The non-transitory computer-readable storage medium of claim 15, wherein the braking distance is further determined based on at least one environmental parameter, the at least one environmental parameter including an incline determined from data identifying a location of the head-worn device system and a direction of travel, and map data including profile information.

* * * * *